March 27, 1928.  1,663,843
P. IMIG
THREE-ROW CORN HUSKER
Filed March 18, 1921 4 Sheets-Sheet 3
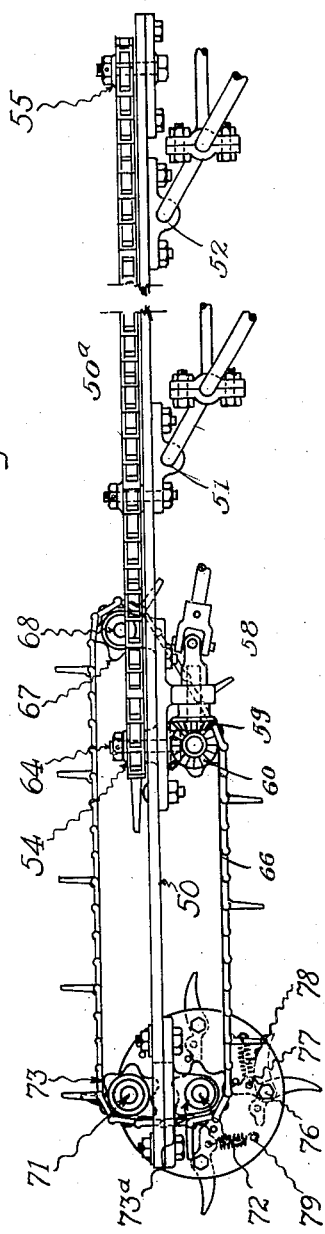
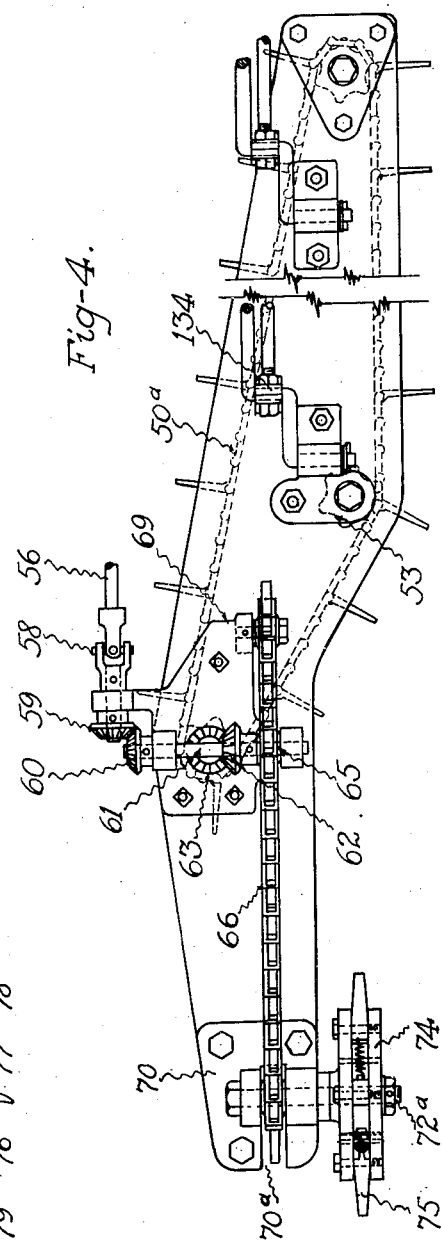

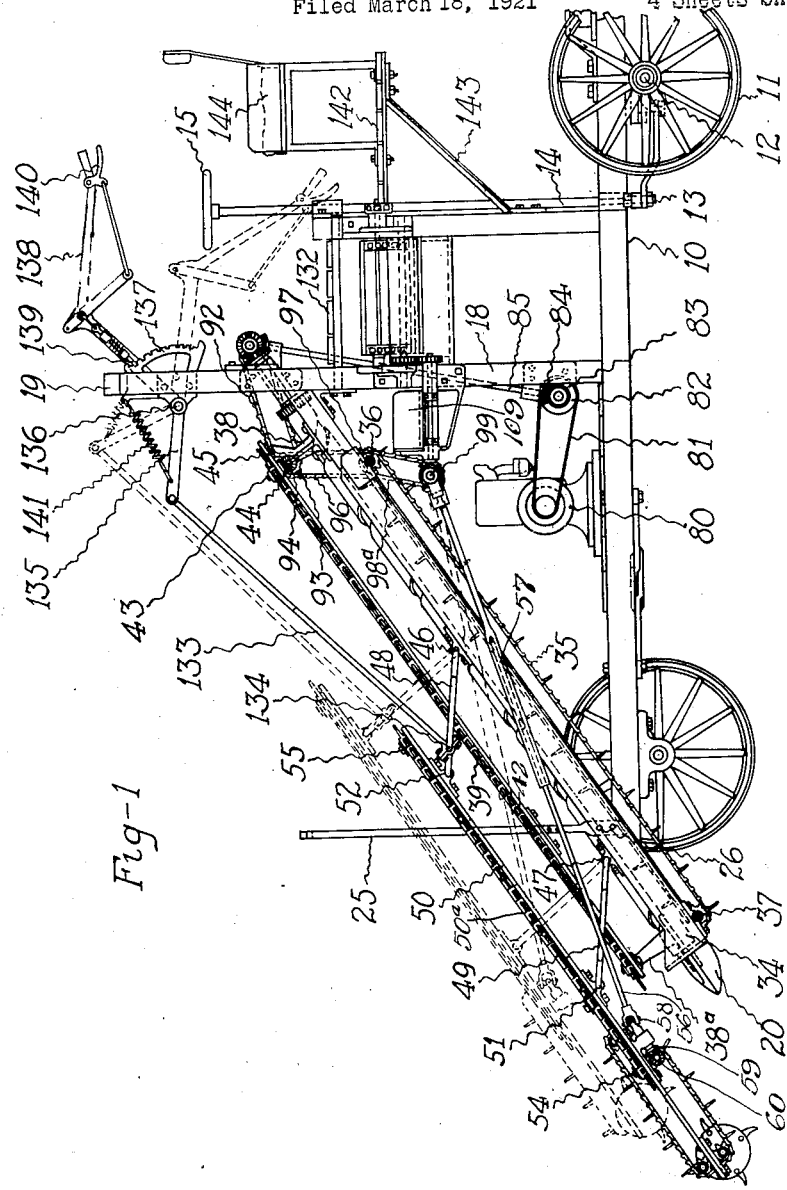

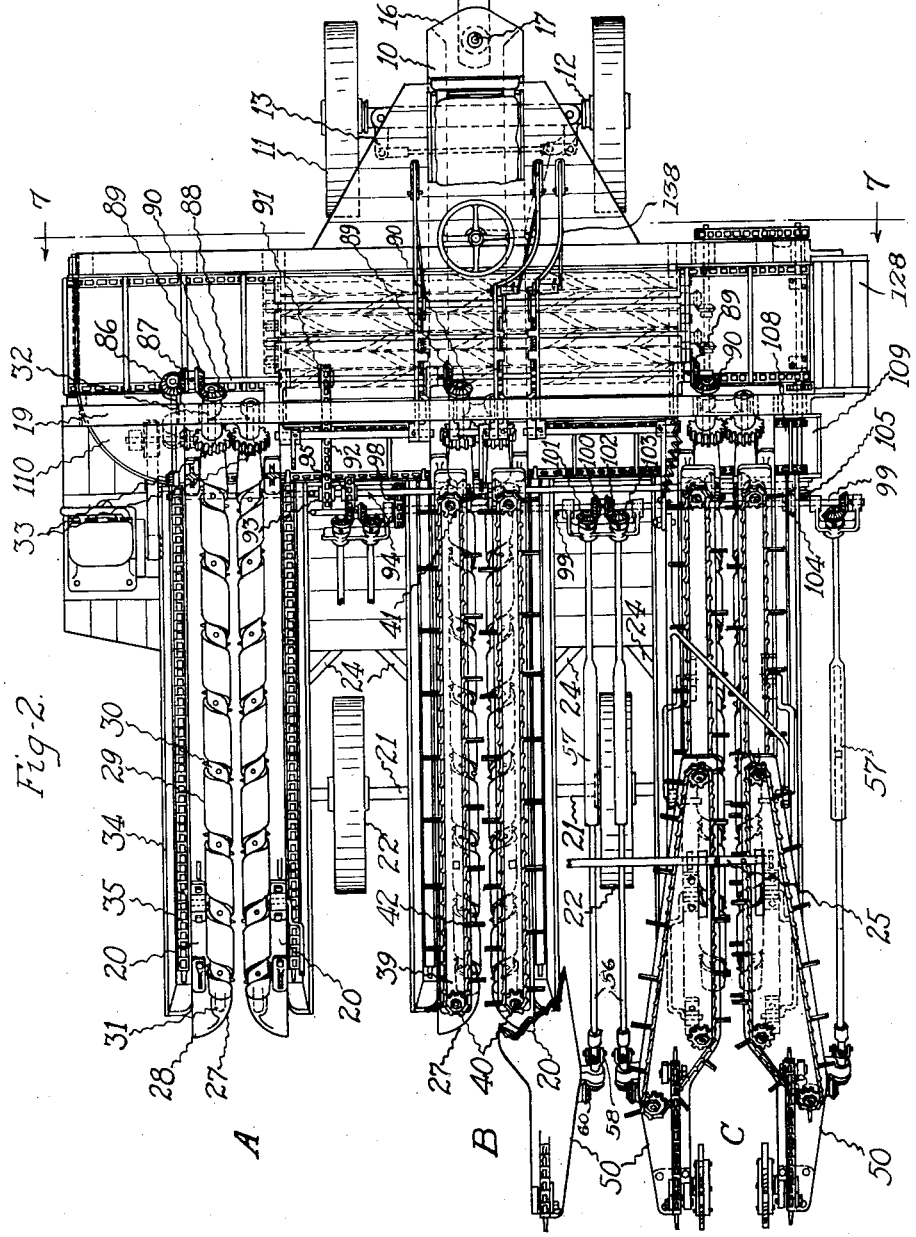

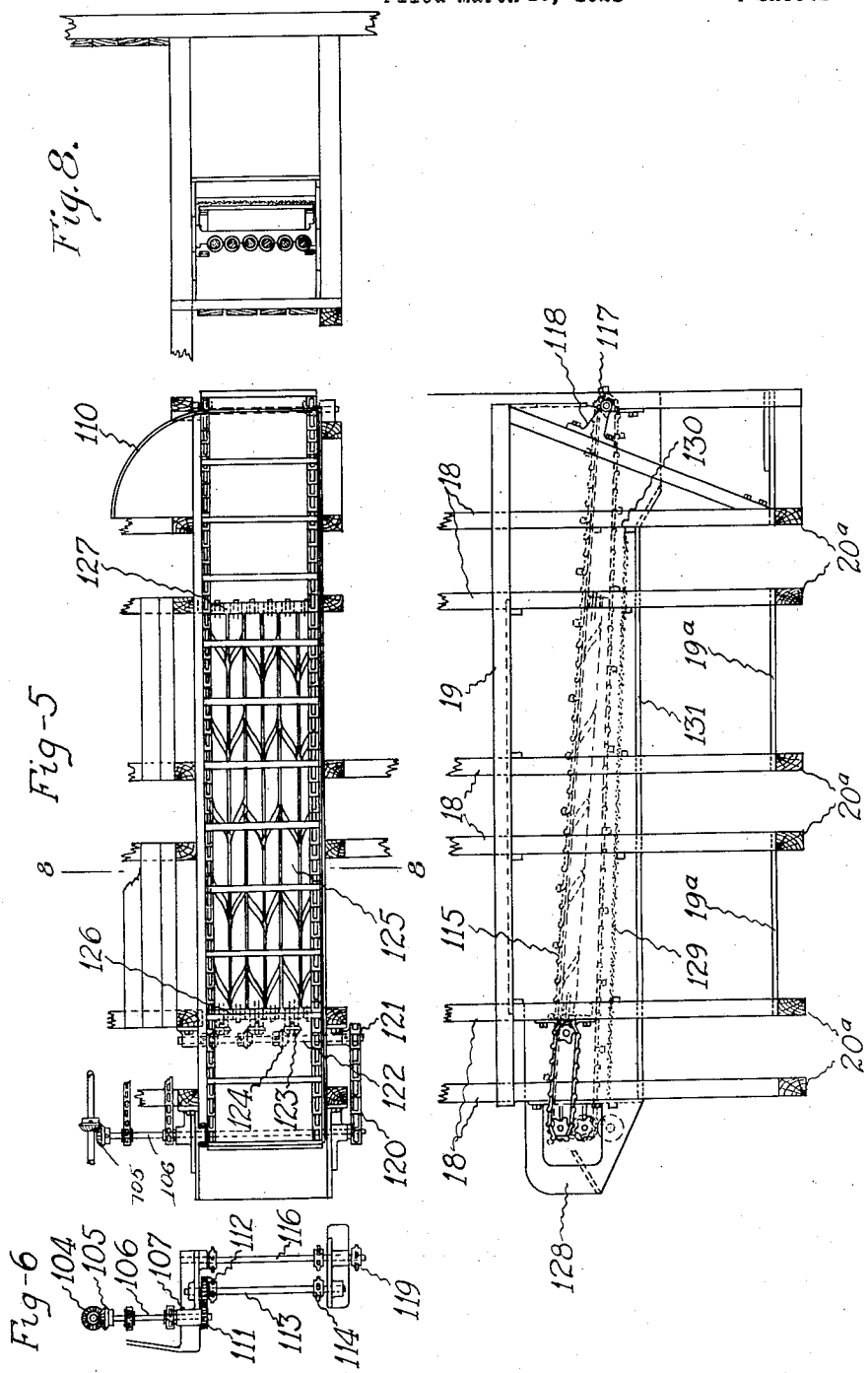

Patented Mar. 27, 1928.

1,663,843

UNITED STATES PATENT OFFICE.

PHILIP IMIG, OF MINIER, ILLINOIS.

THREE-ROW CORN HUSKER.

Application filed March 18, 1921. Serial No. 453,341.

My invention relates to corn huskers and more particularly to a three row corn husker, in which three similar husking mechanisms are mounted in such manner that three rows of corn will be husked simultaneously and the ears of corn husked therefrom carried by a series of conveyors from the machine.

The object of the invention is in the provision of a specially arranged husking machine capable of husking three rows of corn simultaneously with the use of a minimum amount of power.

Another object of my invention is in the special arrangement and construction of the various husking mechanisms with the result that the corn stalks from which the ears of corn have been husked will be left standing after the husking operation has taken place.

Yet another object of my invention is in the special picker mechanism in connection with each of the corn husking devices, said picker mechanism being capable of raising the corn that is upon the ground and raising the stalks for entrance to the husking rolls.

The object of my invention in providing a corn husker constructed in such manner that the corn stalks from which the corn has been taken may be left standing, is obvious. In the present classes of corn husking machines, the corn is husked from the stalks, and due either to the construction of the machine or to the fact that when one row is husked it is necessary to drive the machine over such row, the stalks after the husking operation are mashed down. As is well known, after the corn has been husked, it is customary for the farmer to allow his stock to feed upon the remaining stalks and leaves, and due to the fact that the corn stalks have always been mashed down by the husking machine, a great loss of fodder is occasioned. However, with the construction of the machine now presented, and with the use of a three row husker, it is possible to husk three rows of corn at a time with the result that two of the rows will be left standing and a saving in feed for the stock attained.

Other objects of my invention will appear in the following description in connection with the annexed drawings, in which Fig. 1 is a side elevation of the husking device;

Fig. 2 is a plan view of the corn husker with various elements of the different huskers omitted;

Fig. 3 is a side elevation of the picker mechanism;

Fig. 4 is a bottom plan view in detail of the picker mechanism;

Fig. 5 is a plan view of a portion of the conveyor mechanism;

Fig. 5^A is an elevation of one end of the transverse conveyor and husking rolls.

Fig. 6 is an enlarged detail view of the drive mechanism for said conveyor means, and Fig. 7 is a cross sectional view showing in detail various elements of the transverse conveyor.

Fig. 8 is an end elevation of one of the transverse conveyor members.

Referring to the drawings, 10 designates supporting beams upon which the corn husker is initially constructed. The frame members have mounted thereon at their rear ends wheels 11, said wheels being mounted on the axle 12 in suitable brackets on the base portion or beams 10. Steering connections for the wheels 11 are shown at 13, said steering arm being connected with the upstanding shaft 14, which has mounted at its upper end the steering wheel 15. Thus, it may be seen that by a movement of the steering wheel 15 there will result a steering movement of the wheels 11. A plate or bracket 16 is fixedly mounted on the rear ends of the beams 10 and has pivotal connection as at 17 with any power or drive means desired for the corn husker. Inasmuch as the wheels 11 may be steered and thereby the device, no special driving or power means is necessary for the device and either a tractor, or teams, may be used.

Frame members 18 are attached to and extend upwardly from the beams 10, said members having mounted thereon at their upper ends a cross beam 19 which supports other beams 18 similar to the ones in connection with the frame members 10.

It may be said at this time that the corn husker is to be constructed in such manner that the rows of corn husked by the two outer husking mechanisms will have their stalks standing after the corn has been taken therefrom, and after the machine has passed. With this idea in mind, it will be seen that the device must be constructed in such manner that there will be no obstruction to the corn stalks as they pass through the machine. The present construction contemplates the passing of the corn stalks in the two outer rows through the machine, but not the center row, inasmuch as the center portion of the machine carries the main bracing members for the whole machine, and inasmuch as the steering wheels and axle and the driving means will follow directly behind the middle row, with the result that the center row of corn stalks after having the ears of corn taken therefrom will be knocked down.

With the above in mind and looking at Fig. 7 of the drawings, it will be seen that the intermediate brace members 18 act as the main bracing members of the machine, cross bar 19 being hung from the upper portion of said brace members, and the other bracing members 18 hung from said bar, it being possible, however, to brace the two adjacent members 18 by bracing members 19ª.

With a view of more easily bringing to light the construction of the device to follow, I have named the three different husking mechanisms of the device A, B and C. These three husking mechanisms are similar in all respects, but as shown in Fig. 2 of the drawings various portions have been omitted from each of the devices in order that a clearer showing of the parts thereof may be made.

Bracketed to the brace members 18 and cross bar 19 are forwardly projecting frame members 20, said frame members acting as the basis for all the husker mechanism to be mounted thereon, said frame members 20 being braced at their lower ends by means of beams similar to those shown at 10 in connection with the lower portions of their brace members 18, as shown at 20ª.

As shown in Fig. 2 of the drawings, the frame members 20 are six in number and spaced in such manner that the husking mechanism to be later described, may be mounted thereon. The two frame members 20 of the center row husker mechanism B have their brace members 10 which are the main frame members connected with the brace members of the adjacent frame members, by means of axles 21. On said axles are mounted the load carrying wheels 22 of the forward portion of the husking device.

With a view to further bracing the three parallel and similar husking mechanisms, cross braces 24 are mounted therebetween in such a manner that a rigid mounting at least for the intermediate frame members 20, results. Further bracing of the lower ends of the frame members 20 is provided in the bracket 25 which is attached as at 26 to each of said frame members 20. It is understood that this bracket extends from one frame member to another in such manner and at such height that a corn stalk may pass thereunder.

Inasmuch as the husking machine is to be propelled from the rear, and each separate husking mechanism is to take care of an independent row of corn, the outer ends of the frame members 20 are cut away as at 27 in order that the stalks may, in their passage through the frame members and other mechanisms, have very little obstruction at this point.

Bracket members 28 in the lower end of each of the frame members 20 have pivoted therein as at 31 the husking rolls 29, said husking rolls being of the conventional form and having therein the spiral husking portions 30. The upper ends of the husking rolls 29 pass through brackets 32 in the cross bar 19. Means for driving the husking rolls in connection with the power mechanism to be described later, are the gear wheels 33 which with the application of power to one in an inward direction, consequently turns the other roll with an inward rotation.

It may be said in explanation that the description of one of the husking mechanisms applies generally to the three as they are all alike.

Attached to either side of the frame members 20 are conveyor walls 34 and at the bottom of said conveyor walls or hopper are conveyor chains 35, said conveyor chains running at their lower end about idler members 37 and being driven at their upper ends by sprocket members 36. A single shaft, to be later described, drives the conveyor chains for the husking mechanisms. Projecting upwardly from points adjacent the lower and upper ends of each of the frame members 20 are brackets 38 and 38ª, said brackets having mounted thereon the guideway 39, which has mounted on its upper side a stalk supporting chain 42, passing about an idler 40 and drive sprocket 41, the latter having connection by means of a shaft 43 with a bevel gear 44 in engagement with a second bevel gear 45 mounted on a shaft 94 extending transversely of the machine and upon which similar gears as 44 and 45 are mounted for driving the other stalk supporting chains of the other husking mechanisms.

Pivoted at points 46 and 47 on the frame members 20 are arms 48 and 49 respectively which have pivotal connection as at 51 and 52 with supporting member 50 of the corn picking and raising mechanism now to be described. It may be said generally that the mechanism mounted on the frame member 50 and to be subsequently described through the arms 48 and 49 has an adjustable mounting with the remaining husking mechanism. This mechanism is mounted in such manner that it may be thrown forward until its lowermost point just clears the surface of the ground and in the forward action of the machine it will act to raise the corn stalk that is bent over, in such manner that the stalks will approach the husking rolls in an upright position.

Pivotally mounted on the supports 50 are idlers 53, 54, and 55 and surrounding them is the chain member 50ª having fingers thereon similar to those which are on the stalk supporting chain 42.

Power connections for the picker and stalk raising mechanism is provided in the connecting rod 56 which is telescoped at 57, said rod 56 having a universal joint at 58 connecting the rod with a short shaft having at its outer end the bevel gear 59. A second bevel gear 60 has engagement with the gear 59 and is mounted on the end of a short shaft 61. At a point intermediate the ends of shaft 61 is a bevel gear 62 which has engagement with another bevel gear 63 mounted on the lower side of the support 50. The gear 63 has a short shaft 64 connecting it with the power sprocket or idler 54. It will be seen from the above that power applied to the telescoped connecting rod 56 will be transmitted through the various gears above described to the chain member 50ª. Mounted on the opposite end of the stub shaft 61 is a sprocket 65 which drives the chain member 66, said chain member passing about the idler 67 pivotally mounted as at 68 in the bracket member 69. The chain 66 at its forward end passes about idlers 73 and 73ª pivotally mounted as at 71 and 72 in a bracket member 70. The bracket 70 is slotted as at 70ª in order that the chain may pass about the idler members and through the end of the support member 50. The shaft upon which the idler member 73ª is mounted has an outer extension in the stub shaft 72ª, said shaft having mounted thereon the disk member or picker 74, which has pivoted at 76 in its outer slotted periphery the picker fingers 75. Coil springs 78 connect an inner end 77 of the picker fingers with the disk 74, as at 79.

From the above, it will be seen that power which is transmitted to the portion of the stalk raising mechanism mounted on the frame 50 will be transmitted through the various gears to the picker mechanism above described and the disk member 74 will be rotated in such manner that the fingers thereon will act to pick the corn stalk from the ground, and the chain members 66 to assist in carrying the corn to the other stalk carrying mechanism and husking rolls.

Any suitable power plant, as at 80, is mounted on the device, and power from said plant is transmitted through the belt 81 to a gear 82 and through the bevel gear connections 83 and 84 to an upwardly projecting shaft 85. A bevel gear 86 on the upper end of the power shaft 85 has engagement with a bevel gear 87 on the main power shaft 88 which extends transversely of the machine and is suitably supported thereon. Bevel gears 89 mounted on the shaft 88 have engagement with the bevel gears 90 mounted on the upper end of one of the husker rolls in each husking mechanism, with the result that power transmitted to the main shaft 88 will be transferred to one husker roll of each pair in the husking mechanism and power transmitted to the one will be communicated to the opposite roll through the gears 33 thereon, and therefore all of the husking rolls will be given an inward rotation. A sprocket 91 mounted on the main power shaft 88 transmits power through the chain 92 to a power sprocket 93 mounted on the shaft 94, said shaft 94 carrying thereon the bevel gears 45 previously described, which operate through other gears also previously described, the stalk supporting chain 42. Power is again tranmitted from the shaft 94 by means of the sprocket 95 and chain 96 to a third shaft 97 extending transversely of the device, said third power shaft having mounted thereon the power sprockets 36 previously described, which operate the conveyor chains 35 in the conveyor members for carrying away the corn, which has just been husked by the husker rolls. Again, power is transmitted from the shaft 97 by means of a power sprocket 98 thereon, and a chain 98ª to a fourth power shaft 99, which shaft provides power through the various bevel gears 100, 101, 102, and 103, to the stalk raising and picker mechanisms through the telescoped connecting rods 56.

With the description of the various portions of the husking machie in mind and also their operation so far described, it will be seen that the corn husked by the inwardly rotating roll members will be thrown to either side into the conveyor hoppers 34 and by means of the conveyor chains 35 therein will be carried upwardly and upon reaching the upper end of the husking mechanism will be fed into a conveyor 109 having the power connections and parts now to be described.

A bevel gear 104 on the power shaft 99 transmits power from said shaft through another bevel gear 105 to a shaft 106, which has mounted thereon suitable sprocket members for driving the endless chain member 108 in the corn conveyor designated generally at 109. Other idler members which do not appear in the drawings are mounted at the opposite end of the conveyor 109 which extends transversely of the machine, and in such manner that corn from each of the husking mechanisms will be fed thereinto. At the opposite end of the cross conveyor 109 is a boot portion 110 with a slight depression at its lower end, with the result that corn accumulated therein will be fed from said boot into a second cross conveyor member to be now described, said cross conveyor operating with relation to the first conveyor 109 in the opposite direction and with the result that the corn introduced thereon from the depressed boot member 110 will be conveyed transversely of the machine and eventually, after a second husking operation, ejected from the machine to any receptacle means (not shown).

A detail description of the conveyor means and power connections follows: The shaft 106 is supported in a bearing member 107 and has on its opposite end a gear 111, said gear driving a similar gear 112 on the shaft 113 which is the power shaft for the second cross conveyor. The endless chain 115 of the second conveyor member passes about idler members on a second shaft 116, and power sprockets 114 on the power shaft 113 and about adjustable idler members 117 at the opposite end of the conveyor, said idler members being mounted in brackets 118. The shaft 116 which is rotated by the endless chain 115 passing over the idler members mounted thereon has a sprocket 119 at its outer end and said sprocket, through the chain 120 and sprocket 121 drives a shaft 122. Shaft 122, through a series of bevel gears 123 and 124 drives a series of husking rolls 125 having mountings as at 126 and 127 at points just below the upper flights of the endless conveyor 115. The rolls 125 are constructed similar to the other before mentioned husking rolls and are merely used in this connection as auxiliary huskers, that is, the corn from the first conveyor 109 being fed from the boot member 110 to the second cross conveyor, is carried by the endless conveyor to the husking rolls 125, and any remaining husks thereon will be taken therefrom at this point, the corn completely cleaned, carried on and ejected from the delivery spout 128. A screen 129 is mounted just below the lower flights of the conveyor chain 115 with the result that the husks taken from the corn by the rolls 125 will be fed thereon and carried therefrom by the backwardly moving flights of the conveyor 115 and ejected from the machine at a point designated as 130. 131 designates a bottom portion of the second cross conveyor and is designed to catch any débris. As shown in Fig. 1 of the drawings, a platform 132 is mounted above the second cross conveyor.

As has been previously described, the corn raising and picker mechanism has an adjustable mounting, which comprises the pivoted arms 48 and 49, with their various connect'ons. Means for adjusting this corn raising mechanism is provided in the following mechanism: An arm 133 is pivotally connected to the arm 48 as at 134, said arm 133 having pivotal connection with a bell crank lever 135 pivoted at 136 to bracket members on the frame portions of the machine. 137 shows a slotted segment capable of receiving the spring pressed lug member 139 mounted on the adjusting lever 138. 140 provides means for throwing the lug 139 into or out of connection with the segment 137. The coil spring 141 attached to the bell crank 135 and to the frame portion of the machine is a safety means for the corn raising mechanism in that if the adjusting lever 138 were thrown forward quickly the coil spring 141 would take up the jar transmitted to said mechanism.

In the above it is seen that the description has been limited to one adjustable device for raising the picker mechanism, but it is understood that a similar lever mechanism will be similarly attached to each one.

A platform 142, braced as at 143, is mounted at the rear of the machine and has a seat member 144 thereon, wherein the operator of the corn husking device may be seated with ready access to the steering wheel 15 and the levers 138 for raising and lowering the corn raising mechanism.

The operation of the device is as follows: The harvesting machine is propelled from the rear by any suitable means. The operator, seated on the device, by means of the steering wheel 15 and its connections, steers the machine, and thereby the three mechanisms A, B, and C, in such manner that three rows of corn will be fed to the three sets of snapping rolls and mechanisms. As the machine passes through the corn, the corn raising mechanisms and picker mechanisms will be adjusted by means of the levers 138 to take care of the condition of the corn, that is, if the rows of corn are in upright position throughout, it would not be necessary to lower the corn raising mechanism. However, should the corn be bent over and some of it lie upon the ground it might be necessary to lower the corn raising mechanism to its lowest point, that is, just clearing the ground. It will be seen, however, that by the special mounting of the picker fingers in said mechanism there will be no damage done even should such picker mechanism touch the ground, inasmuch as the fingers have a spring mounting.

The picker mechanism, the chain members 66 and 50ª, in the passage of the machine through the corn, tend to raise the stalks into an upright position until the stalks are fed to the snapping rolls, Again, in the passage of the stalks in their upright position through the snapping rolls, the stalk supporting chain 42 also assists in holding them upright. With the passage of the stalks through the snapping mechanisms, the corn is snapped therefrom and thrown off to the side into the conveyor members adjacent the rolls, the stalks from which the corn has been taken passing entirely through the machine, and are left in a standing position, that is, those passing through the outer snapping mechanisms A and C. Inasmuch as the steering mechanism, supporting mechanism, and the propelling means for the device follow directly behind the center row, it is impossible for the stalks in this row to remain standing and they are knocked down by the members above noted. However, there is no obstruction to the passage of the stalks in their upright position through the outer mechanisms, and they are left standing. The corn thrown into the conveyors adjacent the snapping rolls, is conveyed upwardly and fed into the cross conveyor 109 which carries the corn to its boot portion 110 and the boot portion being depressed slightly at one end, permits the corn to be deposited on the transverse conveyor which has its exit at 128.

In the passage of the corn across this second conveyor, the corn is husked by the rotating roll members 125 and thence deposited on the screen member 129, from which they are forced from the machine by the lower flights of the endless conveyor 115. It may be seen from the above that the ears of corn are forced across the husking rolls 125 by the spaced flights on the endless conveyor 115, these flights being spaced in such distances that the corn will lie therebetween and in such position that the ears will lie directly upon the husking rolls. The husked ears are finally forced along by the conveyor flights and ejected from the machine at the delivery spout 128.

What I claim is:

1. In a three row corn harvester, three individual ear snapping mechanisms including thereon frame portions, snapping rolls, conveyors adjacent said rolls, stalk supporting chain members mounted above said rolls, stalk raising mechanism, including means permitting its adjustment as a unit with relation to said snapping rolls, supporting means for the various snapping mechanisms, a transverse conveyor member, a husking mechanism on said transverse conveyor, a base portion for the snapping mechanism, and load carrying wheels supporting said base portion.

2. In a three row corn harvester, a base portion having load carrying wheels thereon, three separate ear snapping mechanisms, supporting means for said mechanisms in relation to the base portion, the ear snapping mechanisms including thereon snapper rolls, ear conveyors adjacent said rolls, power operated stalk supporting chains mounted above said snapper rolls, stalk raising mechanism positioned in advance of said snapping rolls, including means permitting its adjustment as a unit with relation to said snapping mechanism, said stalk raising mechanism being capable of raising the fallen stalks to an upright position for entrance into the snapper rolls, and conveyor mechanism.

3. In a three row corn harvester, frame members having load carrying wheels thereon, three separate ear snapping mechanisms, means for supporting said mechanisms, the snapper mechanism including thereon snapper rolls, conveyor mechanisms, stalk raising mechanism positioned in advance of the snapper rolls, including means permitting its adjustment with relation to said snapper mechanism, said stalk raising mechanism including thereon a picker mechanism and a power operated stalk raising chain member.

4. In a three row corn harvester, a frame portion, three separate ear snapping mechanisms, supports for said mechanisms, stalk raising means mounted in advance of said snapping mechanism, lever means for adjusting the stalk raising means with relation to the snapping mechanisms, said stalk raising means including thereon a picker wheel, spring pressed finger members mounted in said picker wheel, a power operated chain member operating said picker wheel, a longitudinally disposed chain member for raising the stalks lifted by the picker member, and ear conveying mechanism.

5. In a three row corn harvester, the combination of frame members having load carrying wheels thereon, three separate ear snapping mechanisms, means for supporting the said mechanisms in such manner that the stalks operated upon by the two outer snapping mechanisms may pass entirely through the machine, conveyor mechanism adjacent said snapping mechanism, stalk raising mechanism positioned in advance of the snapper rolls, including means permitting its adjustment with relation to said snapper mechanism, said stalk raising mechanism including thereon a forwardly disposed picker member, a vertically disposed conveyor chain adjacent said picker, and a horizontally disposed stalk supporting chain operating in connection with said before mentioned conveyor chain.

6. In a three row corn harvester, in combination, three separate ear snapping mechanisms, supports for said mechanisms, permitting free passage of the stalks through the outside ear snapping mechanism, stalk raising means mounted in advance of said snapping mechanism, said stalk raising mechanism including thereon a picker wheel, a power operated, vertically positioned conveyor chain disposed in a manner to assist in the raising of the fallen stalks, a second power operated, longitudinally disposed conveyor chain, operating in connection with the before mentioned chain to further raise the stalks to a position to be operated upon by snapper rolls, and lever means for adjusting the stalk raising means with relation to the snapping mechanism.

7. In a corn harvester, the combination of ear snapping mechanism including supporting frames therefor, snapping rolls, conveyors adjacent said rolls, stalk supporting chain members mounted above said rolls and stalk raising mechanism, including power operated stalk raising chain members disposed in advance of the snapper rolls, and means permitting the adjustment of said stalk raising mechanism as a unit with relation to said snapping rolls.

In testimony whereof I have affixed my signature.

PHILIP IMIG.